(12) United States Patent
Sugihara

(10) Patent No.: US 6,525,774 B1
(45) Date of Patent: Feb. 25, 2003

(54) INVERSE TELECINE CONVERTING DEVICE AND INVERSE TELECINE CONVERTING METHOD

(75) Inventor: Motooki Sugihara, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/492,144

(22) Filed: Jan. 27, 2000

(30) Foreign Application Priority Data

Jan. 27, 1999 (JP) .......................................... 11-017846

(51) Int. Cl.[7] .............................. H04N 5/14; H04N 7/01; H04N 11/20
(52) U.S. Cl. ......................... 348/459; 348/558; 348/701
(58) Field of Search ................................ 348/441, 452, 348/459, 554, 555, 556, 557, 558, 699, 700, 701, 526, 527; H04N 7/01, 11/20, 5/14

(56) References Cited

U.S. PATENT DOCUMENTS

| | | | | |
|---|---|---|---|---|
| 5,365,280 A | * | 11/1994 | De Haan et al. ............. | 348/526 |
| 5,734,443 A | * | 3/1998 | O'Grady ..................... | 348/443 |
| 5,757,435 A | * | 5/1998 | Wells ......................... | 348/441 |
| 5,812,202 A | * | 9/1998 | Ng et al. ..................... | 348/446 |
| 5,821,991 A | * | 10/1998 | Kwok ......................... | 348/459 |
| 5,828,786 A | * | 10/1998 | Rao et al. ................. | 348/415.1 |
| 5,844,618 A | * | 12/1998 | Horiike et al. .............. | 348/441 |
| 5,847,772 A | * | 12/1998 | Wells ......................... | 348/446 |
| 5,872,600 A | * | 2/1999 | Suzuki ....................... | 348/441 |
| 5,982,444 A | * | 11/1999 | Kato et al. .................. | 348/446 |
| 6,014,182 A | * | 1/2000 | Swartz ....................... | 348/700 |
| 6,058,140 A | * | 5/2000 | Smolenski .................. | 348/452 |
| 6,115,499 A | * | 9/2000 | Wang et al. .............. | 348/439.1 |
| 6,148,035 A | * | 11/2000 | Oishi et al. ................... | 348/97 |
| 6,154,257 A | * | 11/2000 | Honda et al. ............... | 348/459 |
| 6,236,806 B1 | * | 5/2001 | Kojima et al. .............. | 348/441 |

\* cited by examiner

*Primary Examiner*—John Miller
*Assistant Examiner*—Brian Yenke
(74) *Attorney, Agent, or Firm*—Morgan, Lewis & Bockius LLP

(57) ABSTRACT

An inverse telecine converting device and method converts quasi-television motion picture information back to original cinema motion picture information, wherein the quasi-television motion picture information had been obtained by quasi-converting the original cinema motion picture information. The inverse telecine converting method includes inputting the quasi-television motion picture information including field picture information pieces time-sequentially arranged at a rate of N frames per second such that each frame of the quasi-television motion picture information including top and bottom field picture information pieces and one of every P field picture information pieces of the quasi-television motion picture information is a repetitive field picture information piece; producing judgment frames on the basis of timely-adjacent field picture information pieces of the quasi television motion picture; determining the structure of each judgment frame as being one of a frame structure and a field structure; identifying the repetitive field picture information pieces on the basis of the determined structures corresponding to timely-adjacent judgment frames; and outputting the original cinema motion picture information arranged at a rate of M frames per second, wherein M, N, and P are natural numbers.

16 Claims, 10 Drawing Sheets

INVERSE TELECINE CONVERTING DEVICE AND INVERSE TELECINE CONVERTING METHOD

This application claims the benefit of Japanese Application No. 11-017846, filed in Japan on Jan. 27, 1999.

BACKGROUND OF THE INVENTION

1. Field of the Invention

The present invention relates to an inverse telecine converting device and an inverse telecine converting method for converting quasi television motion pictures produced from frame pictures of a cinema into frame pictures of the original cinema.

2. Description of the Related Art

With respect to television motion pictures, picture information of 30 frames per second (hereinafter referred to as "frame picture information" is time-sequentially displayed on a screen. As shown in FIG. 1, frame picture information 80 is constructed by combining top field picture information 81 and bottom field picture information 82 and then scanning both portions of the field picture information.

A conversion method shown in FIG. 2 (hereinafter referred to as "telecine conversion") has been hitherto utilized to produce video motion pictures for TV from a cinema film (24 frames per second) because the number of frames per second is different between the cinema and the TV formats. According to the conventional telecine conversion method, the frame picture information of a cinema (movie) is replaced as top field picture information (at the upper stage of the video field of FIG. 2) or bottom field picture information (at the lower stage of the video field of FIG. 2).

Through this telecine conversion, one field picture information piece is inserted as repetitive field picture information every five field picture information pieces. There are two cases for the insertion of the repetitive field picture information. In one case, the just-previous top field picture information (the second preceding field picture information) is set as top field image information corresponding to the repetitive field picture information concerned. In the other case, the just-previous bottom field picture information (the second preceding field picture) is set as bottom field image information corresponding to the repetitive field picture information concerned. In the following description, the television motion picture information thus produced from the cinema film is referred to as "quasi television motion picture information".

Recently, DVD (Digital Versatile Disk) has been rapidly developed and now being popularized in the market. The propagation of DVD has promoted the production of motion picture software (video contents) for DVD from conventional quasi television motion picture information. When motion picture software (video content) for DVD is produced from conventional quasi television motion picture information, it is indispensable to delete repetitive field picture information in the quasi television motion picture information and return the quasi television motion picture information to picture information of 24 frames per second (hereinafter referred to as "inverse telecine conversion").

The importance of deleting the repetitive field information is two-fold. First, the picture information is subjected to compression (encoding) processing for DVDs. In this case, the compression efficiency is increased by returning quasi television motion picture information (30 frames per second) containing repetitive field picture information to original cinema motion picture information (24 frames per second) containing no redundant information and then compressing the original cinema motion picture information, as compared to directly compressing the quasi television motion picture information. Here, the image quality also is better with the repetitive field information removed for a specific amount of data. Second, when picture information is reproduced in a DVD reproducing device (player) while advancing frames, the frame advance of a cinema film can be directly implemented.

FIG. 3 is a conceptual diagram showing inverse telecine conversion in the conventional inverse telecine converting device.

As shown in FIG. 3, quasi television motion picture information (i.e., video frames at 30 frames per second) obtained from a telecine converted cinema film processing is input to an inverse telecine conversion device. Repetitive field picture information contained in the quasi television motion picture information is deleted as indicated by the dotted-line frame in FIG. 3, thereby converting the quasi television motion picture information to the picture information of a reproduced original movie film of 24 frames per second.

At the same time, control flags which are needed to re-convert the picture information of 24 frames per second to television picture information of 30 frames per second, are generated and added to the frames of the picture information of the original movie film thus reproduced. In FIG. 3, a control flag TFF controls to give priority to the top field picture information in the frame provided with the control flag TFF. A control flag BFF controls to give priority to the bottom field picture information in the frame provided with the control flag BFF. A control flag RFF controls to set the first field picture information in the frame concerned to the repetitive field picture information.

Next, the principle of conventional inverse telecine conversion will be described.

As described above, the insertion period and the insertion position of the repetitive field picture information pieces which are inserted through the conventional telecine conversion are determined in advance. A method of deleting the field picture information pieces located at predetermined positions every five fields using the above fact (hereinafter referred to as "fixed-period field deletion method") is considered to be the simplest method. In the case of cinema, a cinema (movie) is normally composed of a set of plural film rolls. In this case, the picture information of each film roll is converted to television motion picture information. Then, the television motion picture information corresponding to the film rolls are joined together and edited to obtain one video tape. However, the top fields or bottom fields are usually displaced between the front and back sides at the place where the two portions are joined with respect to the joint places. Therefore, the period of the repetitive field picture information is deviated from the fixed period. Accordingly, if the fixed-period field deletion method is applied carelessly, originally-needed picture information that is not repetitive field picture information may be deleted.

FIG. 4 shows an inverse telecine converting method that has been conventionally used to solve the above problem. According to this method, the correlation between the pixel values of timely-adjacent top field picture information pieces and the correlation between the pixel values of timely-adjacent bottom field picture information pieces are checked over several frames of quasi television motion picture information obtained through the telecine conversion processing. Then, one of two field picture information pieces which are judged to be highly correlated with each other is regarded as repetitive field picture information and deleted.

In the conventional inverse telecine converting device shown in FIG. 4, however, in a case of pictures having a lot of noise or in a case of pictures of a scene having little motion, any field picture information piece will have high correlation in pixel value with another field picture information piece. Thus, it is difficult to identify which field picture information piece is repetitive field picture information.

SUMMARY OF THE INVENTION

Accordingly, the present invention is directed to a inverse telecine converting device and inverse telecine converting method that substantially obviate one or more of the problems due to limitations and disadvantages of the related art.

An object of the present invention is to provide an inverse telecine converting device and an inverse telecine converting method that can identify repetitive field picture information for even pictures containing a lot of noise and pictures of a scene having little motion.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an inverse telecine converting device converts quasi-television motion picture information back to original cinema motion picture information, wherein the quasi-television motion picture information has been obtained by quasi-converting the original cinema motion picture information. The inverse telecine converting device includes means for inputting the quasi-television motion picture information including field picture information pieces time-sequentially arranged at a rate of N frames per second (N being a natural number), each frame of the quasi-television motion picture information including top and bottom field picture information pieces such that one of every P field picture information pieces (with P being a natural number) of the quasi-television motion picture information is a repetitive field picture information piece; means for producing judgment frame picture information pieces on the basis of timely-adjacent field picture information pieces of the quasi television motion picture; means for determining the structure of each judgment frame as being one of a frame structure and a field structure; means for identifying the repetitive field picture information pieces on the basis of the determined structures corresponding to timely-adjacent judgment frame picture information pieces; and means for outputting the original cinema motion picture information arranged at a rate of M frames per second (with M being a natural number).

In another aspect, an inverse telecine converting method converts quasi-television motion picture information back to original cinema motion picture information, wherein the quasi-television motion picture information has been obtained by quasi-converting the original cinema motion picture information. The inverse telecine converting method includes inputting the quasi-television motion picture information including field picture information pieces time-sequentially arranged at a rate of N frames per second (with N being a natural number), each frame of the quasi-television motion picture information including top and bottom field picture information pieces such that one of every P field picture information pieces (with P being a natural number) of the quasi-television motion picture information is a repetitive field picture information piece; producing judgment frames on the basis of timely-adjacent field picture information pieces of the quasi television motion picture; determining the structure of each judgment frame as being one of a frame structure and a field structure; identifying the repetitive field picture information pieces on the basis of the determined structures corresponding to timely-adjacent judgment frame picture information pieces; and outputting the original cinema motion picture information arranged at a rate of M frames per second (with M being a natural number).

In another aspect, an inverse telecine converting device for converts quasi-television motion picture information back to original cinema motion picture information, wherein the quasi-television motion picture information has been obtained by quasi-converting the original cinema motion picture information. The inverse telecine converting device includes first, second, and third field delays to receive a series of field picture information pieces from an input; first, second, and third block generators to combine timely-adjacent field picture information pieces received from the input and the first, second and third field delays to produce a series of judgment frame picture information pieces, each of the judgment frame picture information pieces including two timely-adjacent information pieces; a plurality of orthogonal transformers to subject each judgment frame to orthogonal transformation and to obtain a high-order coefficient of a frequency area on the basis of pixel values in the vertical direction for each judgment frame; and a comparator to compare each high-order coefficient and to determine whether each respective judgment frame picture information piece has a frame structure or a field structure.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Reference will now be made in detail to the preferred embodiments of the present invention, examples of which are illustrated in the accompanying drawings.

Figure 1:
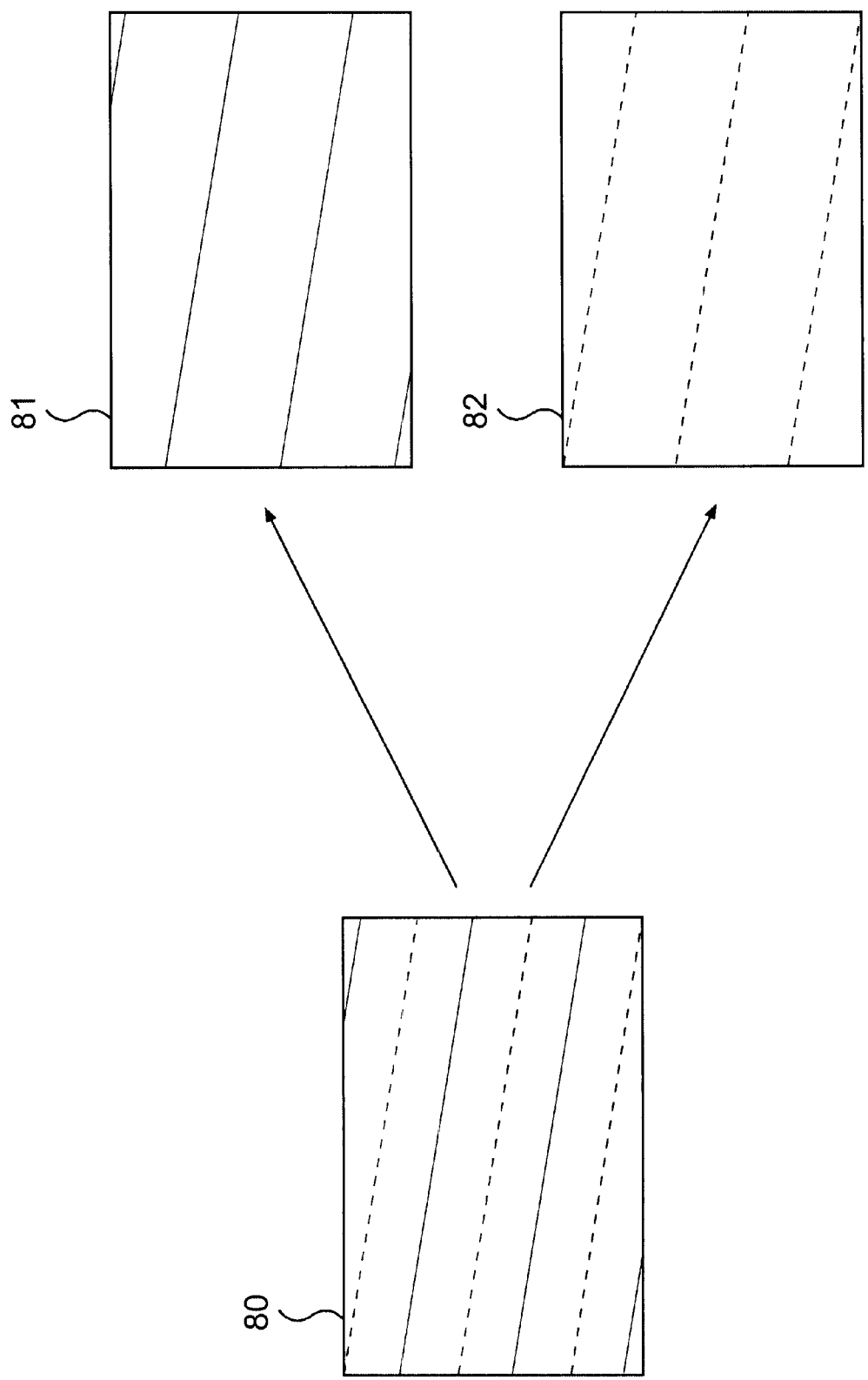
FIG. 1 is a diagram showing the construction of frame picture information in television motion picture information.
Figure 2:
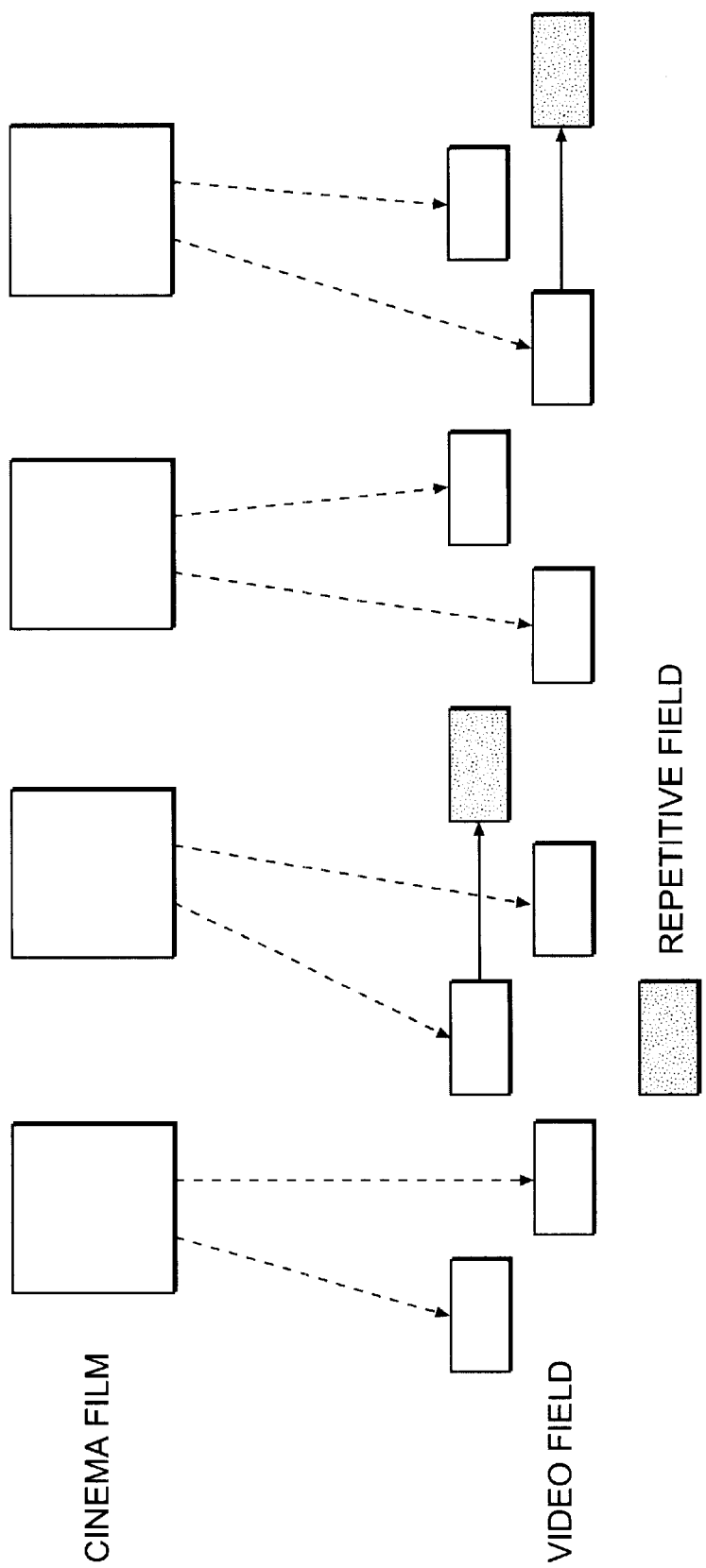
FIG. 2 is a conceptual diagram showing a conventional telecine converting method.
Figure 3:
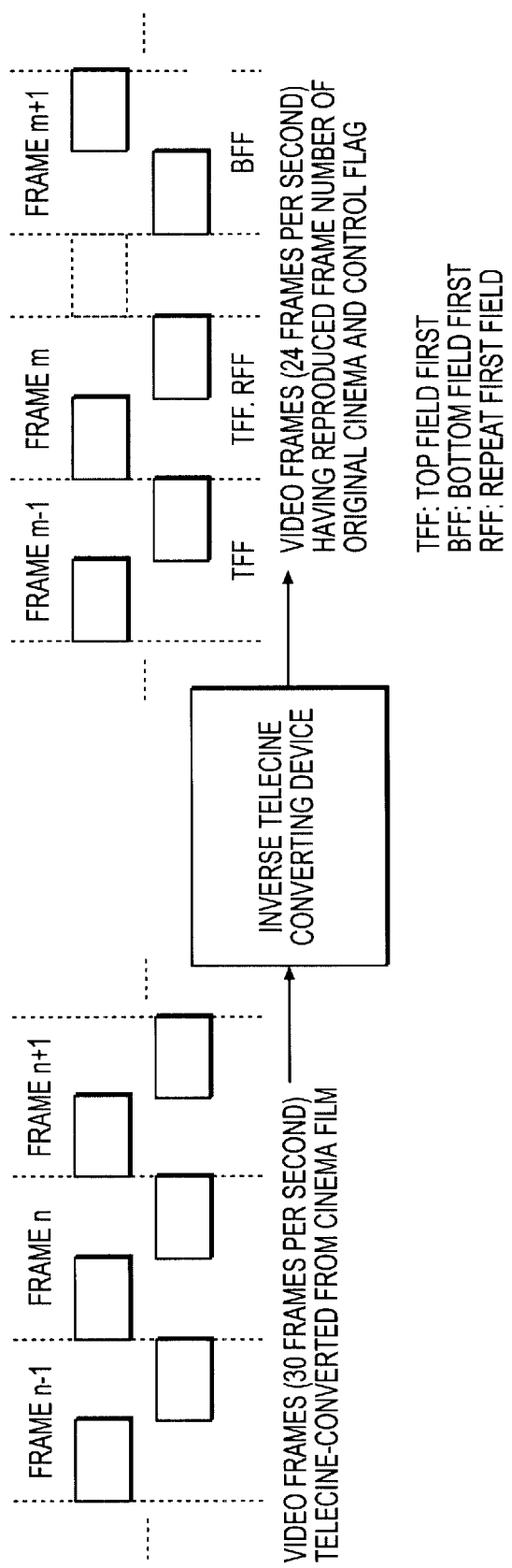
FIG. 3 is a conceptual diagram showing a conventional inverse telecine converting method.
Figure 4:
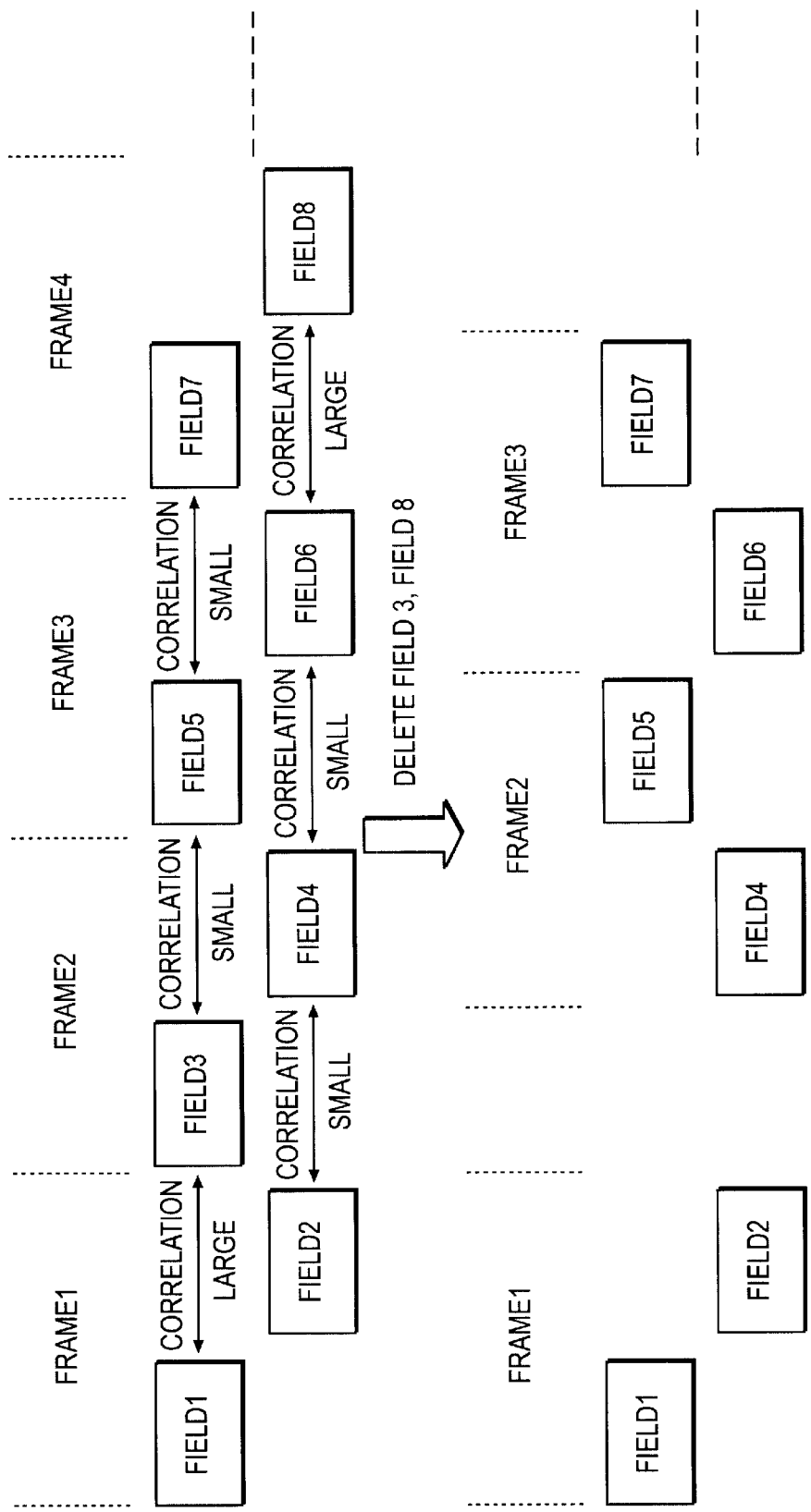
FIG. 4 is a conceptual diagram showing another conventional inverse telecine converting method.
Figure 5:
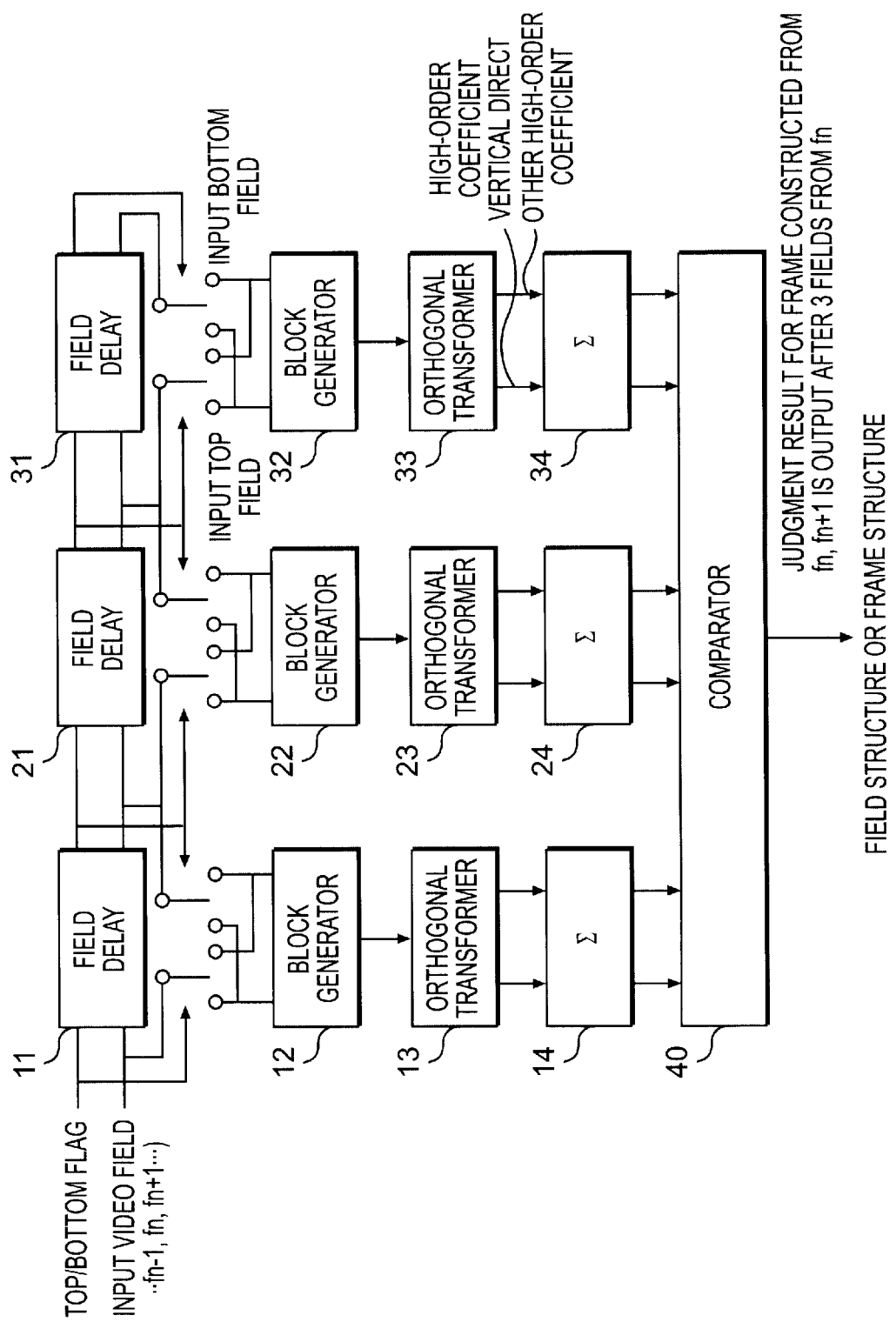
FIG. 5 is a block diagram showing the construction of an inverse telecine converting device according to an embodiment of the present invention.

FIG. 5 is a block diagram showing the construction of an inverse telecine converting device according to an embodiment of the present invention. As shown in FIG. 5, the inverse telecine converting device comprises field delays 11, 21 and 31, block generators 12, 22 and 32, orthogonal transformers 13, 23 and 33, integrators 14, 24 and 34, and a comparator 40.

The construction and operation of the inverse telecine converting device will be described hereunder in detail with reference to the drawings.

Top field picture information or bottom field picture information of telecine-converted quasi television motion picture information is input to the field delay 11 and the block generator 12. The field delays 11, 21, 31 have the function of delaying input information thereto and output the delayed information.

The output of the field delay 11 is input to the field delay 21 and the block generators 12 and 22. The output of the field delay 21 is input to the field delay 31 and the block generators 22 and 32. Further, the output of the field delay 31 is input to the block generator 32.

The output of the block generator 12 is input to the orthogonal transformer 13, the output of the orthogonal transformer 13 is input to the integrator 14, and the output of the integrator 14 is input to the comparator 40. Likewise, the output of the block generator 22 is input to the orthogonal converter 23, the output of the orthogonal transformer 23 is input to the integrator 24, and the output of the integrator 24 is input to the comparator 40. The output of the block generator 32 is input to the orthogonal transformer 33, the output of the orthogonal transformer 33 is input to the integrator 34, and the output of the integrator 34 is input to the comparator 40.

Figure 6:
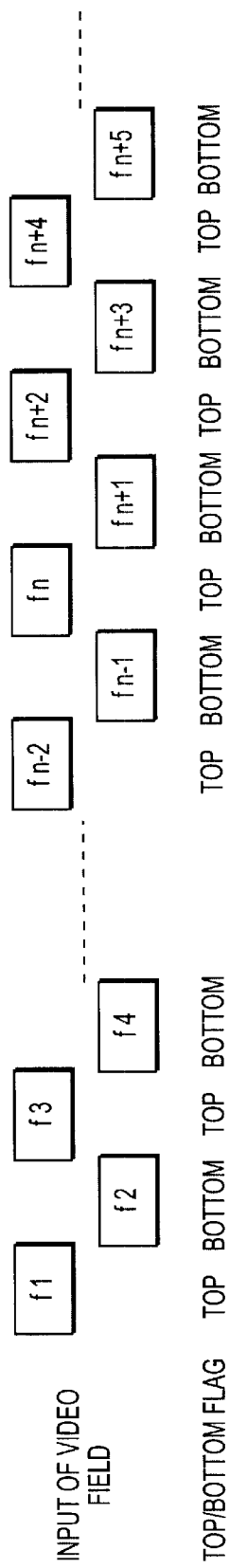
FIG. 6 is a conceptual diagram showing quasi television motion picture information and appendant flags which are input to the inverse telecine converting device of FIG. 5.

FIG. 6 is a conceptual diagram showing quasi television motion picture and appendant flags which are input to the inverse telecine converting device shown in FIG. 5. In FIG. 6, f1 . . . , fn, . . . represent field picture information pieces (video fields) input to the inverse telecine converting devices of FIG. 5. The upper stage of the input video field of FIG. 6 represents the top field picture information, and the lower stage of the input video field of FIG. 6 represents the bottom field picture information. In the following description, fn represents an n-th field picture information piece (hereinafter abbreviated as "field n").

Figure 7:
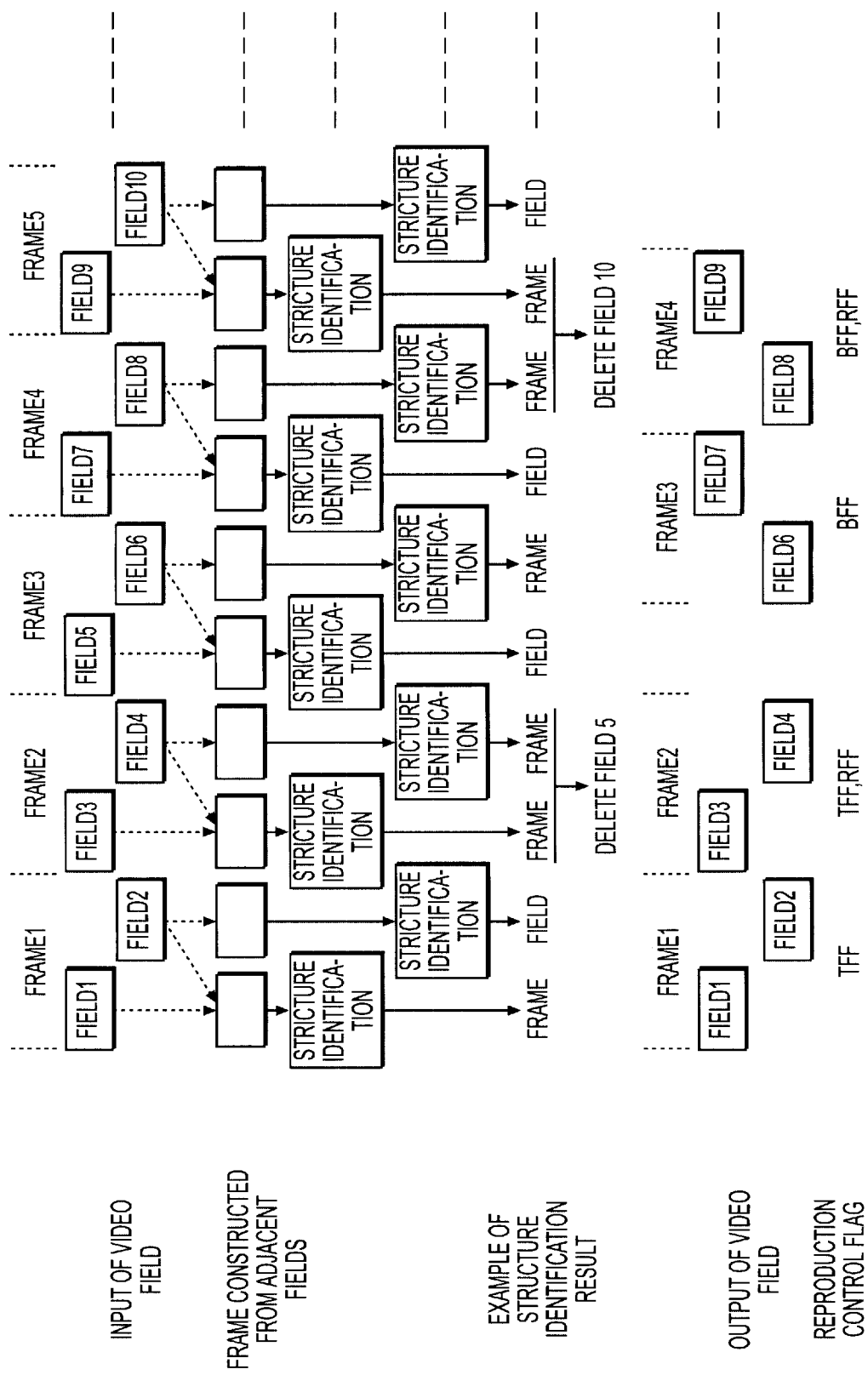
FIG. 7 is a conceptual diagram showing the operation of the inverse telecine converting device shown in FIG. 5.

FIG. 7 is a conceptual diagram showing the operation of the inverse telecine converting device shown in FIG. 5. As shown in FIG. 7, temporary frame picture information is produced on the basis of timely-adjacent field picture information pieces by the field delay 11, 21 and 31 and the block generator 12, 22 and 32. For example, timely-adjacent fields 1 and 2 are combined with each other to construct a temporary frame picture information piece 1 (hereinafter referred to as "temporary frame 1"), and timely-adjacent fields 2 and 3 are combined with each other to construct a temporary frame 2. Subsequently, a field n and a field (n+1) are combined to construct a temporary frame n in the same manner. In the following description, the temporary frame picture information is referred to as "judgment frame picture information" and the temporary frames are referred to as "judgment frames."

The structure of each judgment frame is identified by the orthogonal transformer 13, 23 and 33, the integrator 14, 24 and 34 and the comparator 40. When both of the field picture information pieces of the judgment frame correspond to one of the original cinema film frames, the judgment frame constitutes normal frame picture information. In this case, the judgment frame is defined to have a "frame structure." On the other hand, when the two field picture information pieces of the judgment frame correspond to different ones of the original cinema film frames, the judgment frame does not constitute normal frame picture information. That is, one of the field picture information pieces corresponds to one frame of the original cinema film, but the other field picture information piece corresponds to a different frame of the original cinema film. In this case, the judgment frame is defined to have a "field structure." Here, the field information pieces are not timely sequential, and the judgment frame is an aggregation of field picture information pieces.

The field structure may result from the judgment frame being formed by a bottom field information piece of a frame and a top field information piece from of the following frame. Alternatively, one of the two field information pieces may be a repetitive field picture information piece and, therefore, may correspond to a previous field. As can be recognized, all judgment frames will have one of the frame structure and field structure.

Figure 8:
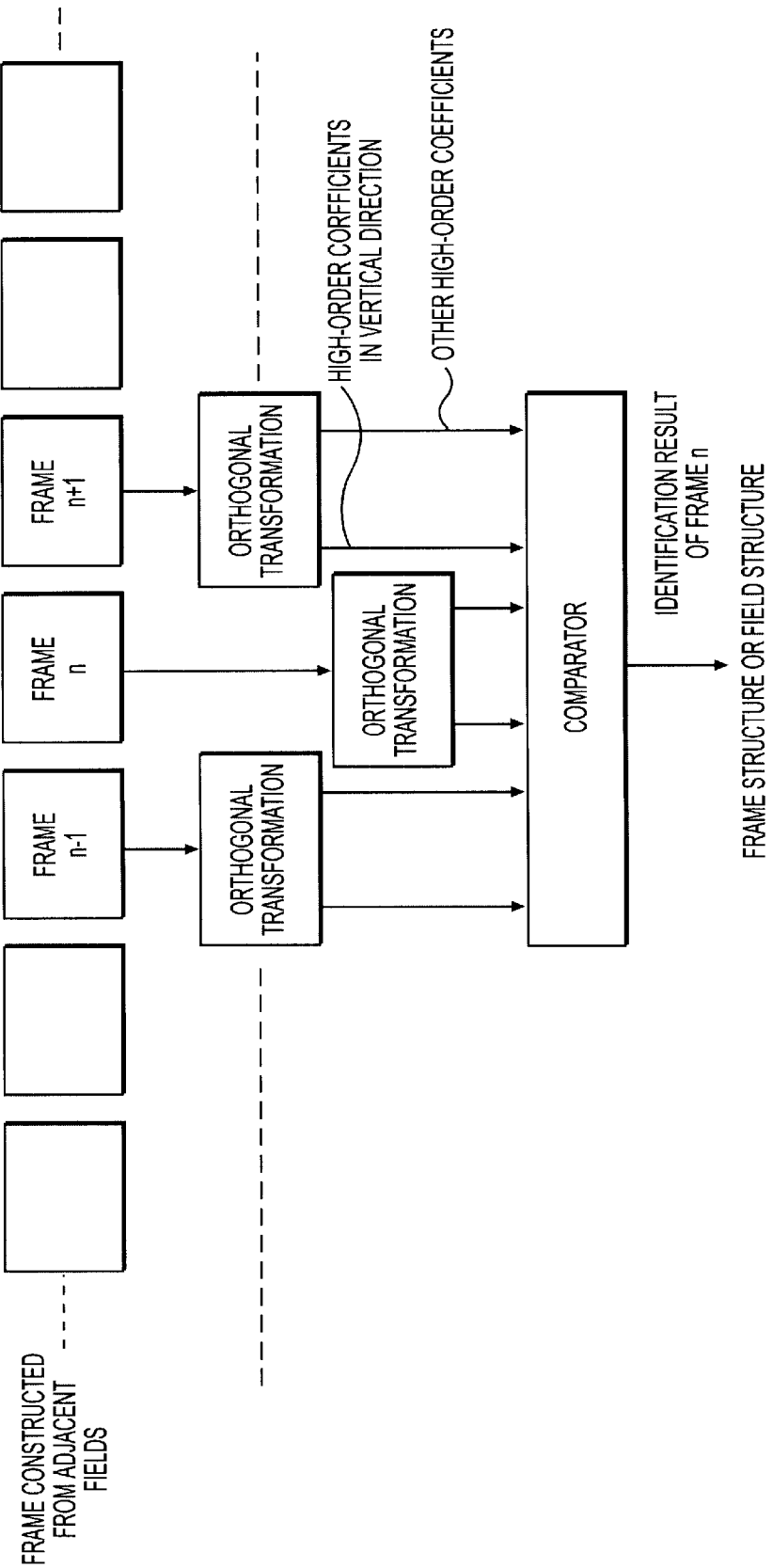
FIG. 8 is a conceptual diagram showing a structure judgment method of frame motion picture information in the inverse telecine converting device shown in FIG. 5.

FIG. 8 is a conceptual diagram showing a structure judgment method of frame picture information in the inverse telecine converting device shown in FIG. 5.

First, the judgment frames that are constructed on the basis of the adjacent field picture information pieces as described above are subjected to orthogonal transformation by the orthogonal transformers 13, 23 and 33. The orthogonal transformation serves to obtain coefficients in a frequency area on the basis of the pixel values of the frame picture information, and DCT (Discrete Cosine Transformation), Fourier Transformation, etc. are contained in the orthogonal transformation.

As described above, when the judgment frame has a field structure, one of the two field picture information pieces thereof corresponds to a specific frame of the original cinema film, but the other one of the two field picture information pieces corresponds to a different frame of the original cinema film. Accordingly, the top field picture information piece and the bottom field picture information piece of the judgment frame having the field structure are not timely-sequential pictures. The pixels of such a judgment frame may be illustrated as shown at the left side of FIG. 9. At the left side of FIG. 9, a non-hatched horizontal array represents one field picture information (for example, top field picture information), and a hatched horizontal array represents the other field picture information (for example, the bottom field picture information). As described above, there is little similarity in the vertical direction (up-anddown direction) in FIG. 9, and variation of information is great if viewed in the vertical direction (up-and-down direction).

Even for original pictures having little motion, these pictures have the same property as described above in terms of brightness, and when the judgment frame picture information has the field structure, variation in brightness information is great in the vertical direction (up-and-down direction).

Figure 9:
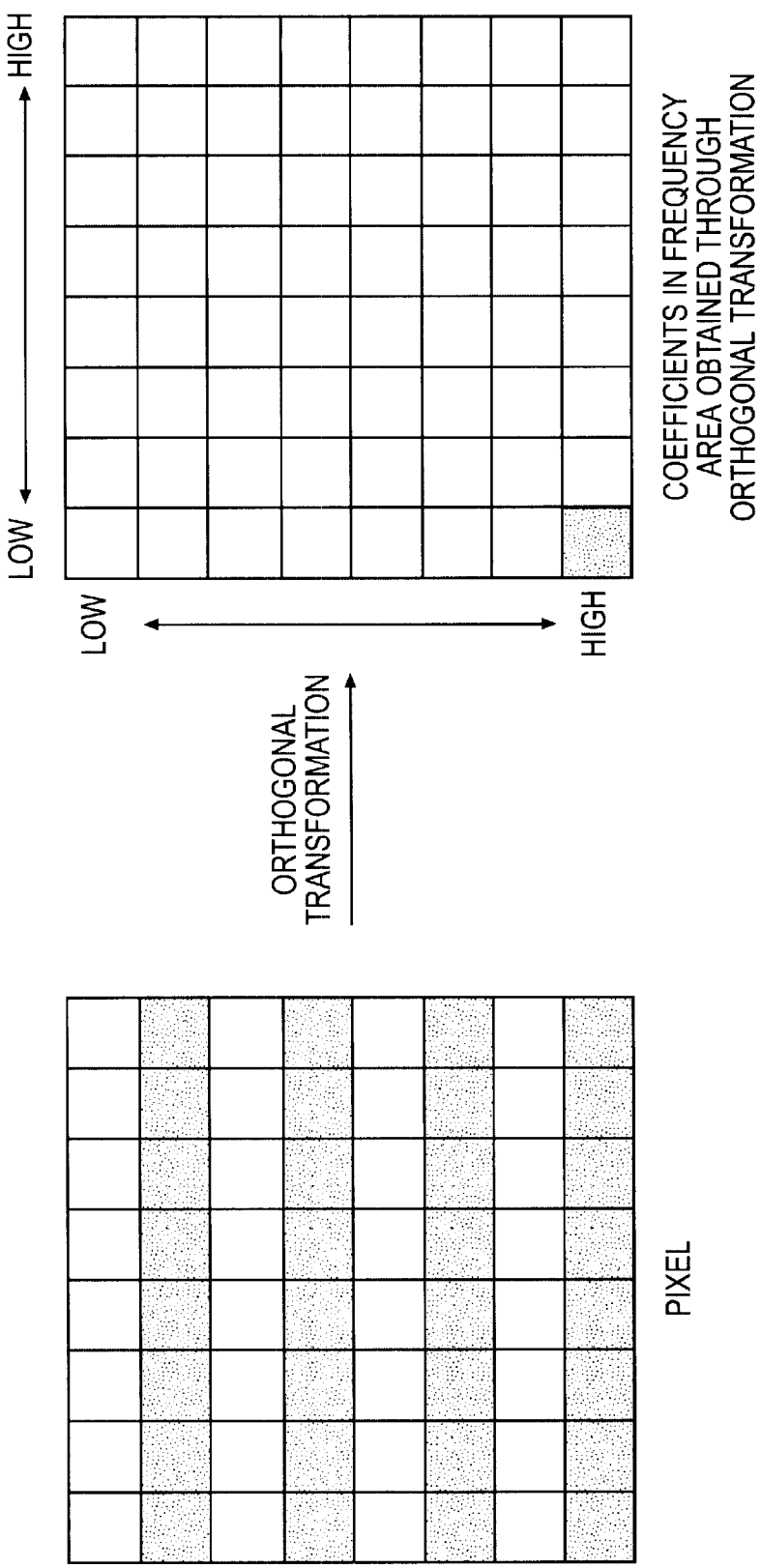
FIG. 9 is a conceptual diagram showing the structure judgment method of frame picture information in the inverse telecine converting device shown in FIG. 5.

When the frame picture information having the frame picture information as shown at the left side of FIG. 9 is subjected to orthogonal transformation, the coefficients of the frequency area as shown at the right side of FIG. 9 are obtained. In the right side of FIG. 9, the coefficient in the vertical direction is a higher degree as shifted from the upper side to the lower side. Further, the coefficient in the horizontal direction is a higher degree as shifted from the left side to the right side.

When the judgment frame picture information has the field structure, a peculiar tendency appears in the high-order coefficient in the vertical direction as represented by the value of the coefficient at the lower left corner of the right-handed diagram of FIG. 9. For example, for the normal frame structure, the absolute value of the high-order coefficient in the vertical direction is less than a predetermined threshold value. On the other hand, for the field structure, the absolute value of the high-order coefficient in the vertical direction may be above the predetermined threshold value. Alternatively, in comparing the adjacent judgment frames, the absolute value of the corresponding coefficient becomes larger in case of the field structure.

With the inverse telecine converting device of this embodiment, the high-order coefficient in the vertical direction of the coefficients in the frequency area are obtained using the orthogonal conversion and considered. If the high-order coefficient exhibits the above-described characteristics, the judgment frame is determined to have the field structure.

Subsequently, the relationship between the judgment frame picture information which is judged as having the field structure and judgment frame picture information located before and after the judgment frame picture information concerned is investigated to extract and delete the repetitive field picture information (see FIG. 7).

An example of a conversion algorithm of extracting and deleting repetitive field picture information in the inverse telecine converting device of FIG. 5 will now be explained with reference to FIG. 10.

Figure 10:
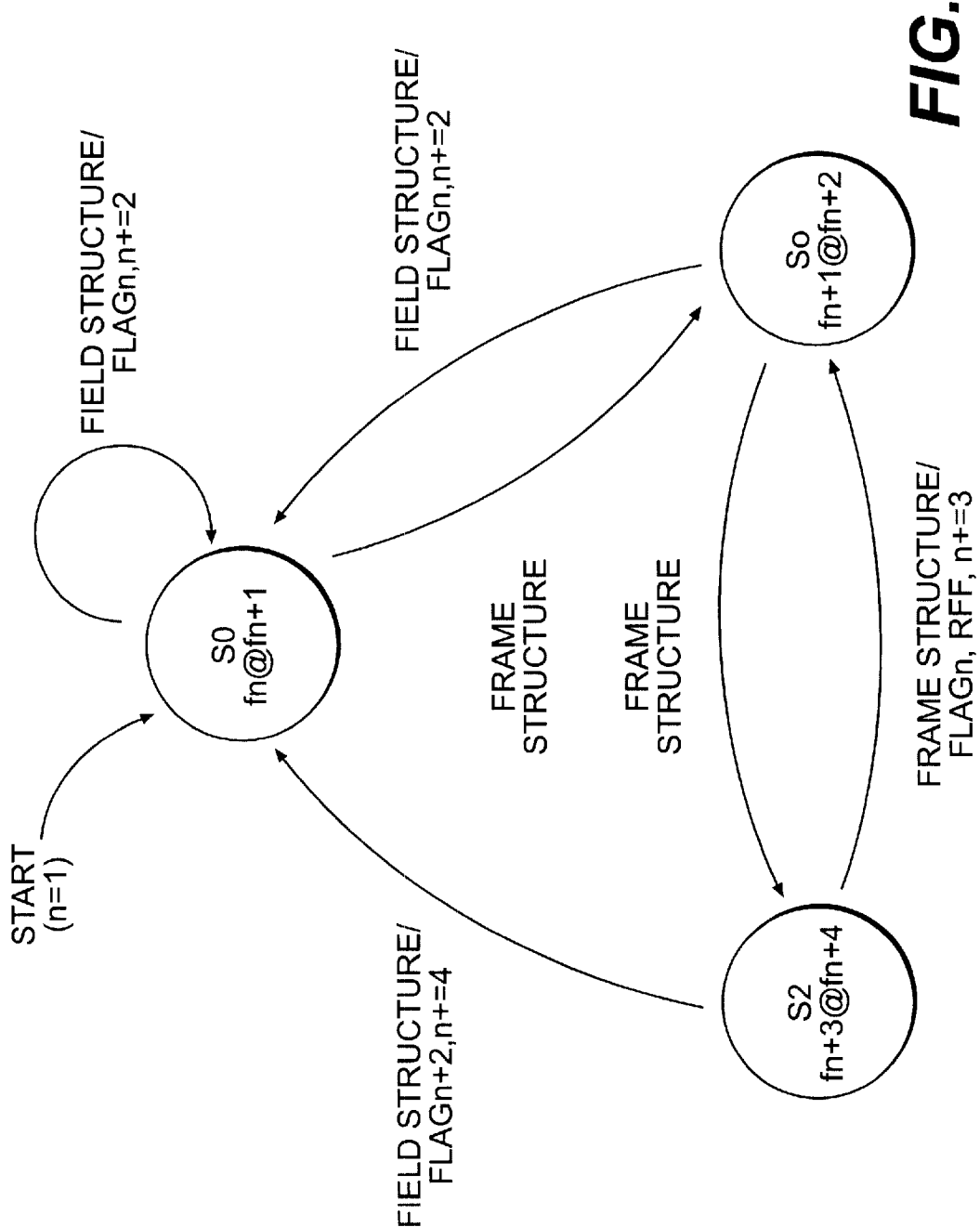
FIG. 10 is a conceptual diagram showing an example of a conversion algorithm in the inverse telecine converting device shown in FIG. 5.

As shown in FIG. 10, at the start time, a field counter (n) is set to 1. First, a state 0 (S0) is executed. In the state 0, the structure of the judgment frame constructed on the basis of a field n (fn) and a field (n+1) (fn+1) is identified. In this case, if the "field structure" is identified, fn and fn+1 are set as one frame and a control flag FLAGn is added to the frame. The control flag FLAGn represents the control flag TFF if fn is a top field, and represents the control flag BFF if fn is a bottom field. As post processing, a field pointer is advanced by 2 (corresponding to a one-frame advancement) to perform the subsequent processing. On the other hand, if the identification of the state 0 indicates the "frame structure", the processing goes to a next state 1 (S1). In FIG. 10, the field pointer is not advanced at this time.

In the state 1, the structure of the judgment frame constructed on the basis of the field (n+1)(fn+1) and a field (n+2)(fn+2) is identified. If it is identified as "field structure", fn and fn+1 are set as one frame, and the control flag FLAGn is added to the frame. As post processing, the field pointer is advanced by 2 (corresponding to one-frame advancement) to perform the subsequent processing. On the other hand, if the identification of the state 1 indicates "frame structure", the processing goes to a next state 2 (S2) without advancing the field pointer.

In the state 2, the structure of the judgment frame constructed on the basis of a field (n+3)(fn+3) and a field (n+4)(fn+4) is identified. If the identification of the structure indicates "field structure", fn and fn+1 are set as one frame and FLAGn is added, and fn+2 and fn+3 are set as one frame, and a control flag FLAGn+2 is added. As post processing, the field pointer is advanced by 4 (corresponding to two-frame advancement) to perform the subsequent processing. On the other hand, if the identification of the state 2 indicates "frame structure", fn and fn+1 are set as one frame, and the control flags FLAGn, RFF are added. As post processing, the field pointer is advanced by 3 to perform the subsequent processing. This processing corresponds to deletion of frame fn+2 and one-frame advancement.

The present invention is not limited to the above embodiment. The above embodiment is an example, and any device may be encompassed in the subject matter of the present invention insofar as it has the substantially same construction as the technical idea claimed in this application and the same action and effect.

For example, in the above embodiment, through the telecine conversion, the cinema motion picture information constructed by frame picture information pieces which are timely sequential at a rate of 24 frames per second is quasi-converted to television motion picture information constructed by frame picture information pieces which are timely sequential at a rate of 30 frames per second. However, the present invention is not limited to this embodiment, and it may be applied to a case where telecine conversion using a different condition is used. For example, the same effect can be obtained if cinema motion picture information constructed by frame picture information pieces which are timely sequential at a rate of m frames per second (m: natural number) is converted to television motion picture information constructed by television motion picture information constructed by frame image picture information pieces (each comprising two field picture information pieces) which are timely sequential at a rate of n frames per second (n: natural number). In this case, the frame picture information is converted to the field picture information and also a repetitive field picture information piece is inserted every p field picture information pieces (p: natural number). If m<n, p is a quotient obtained by dividing n by (n−m).

In the above embodiment, the judgment frame picture information is subjected to the orthogonal transformation, and "field structure" or "non-field structure" is identified on the basis of the characteristic of the high-order coefficients in the vertical direction in the frequency area which are obtained through the orthogonal transformation. However, the present invention is not limited to this method.

As described above, according to the present invention, the identification of the repetitive field picture information is carried out, not on the basis of the pixels of the picture information itself, but on the basis of the characteristic of the high-order coefficients in the vertical direction in the frequency area obtained by orthogonally transforming the pixels. Therefore, the repetitive field picture information can be easily identified even for pictures having lots of noises or pictures of a scene having little motion.

It will be apparent to those skilled in the art that various modifications and variations can be made in the inverse telecine converting device and inverse telecine converting method of the present invention without departing from the spirit or scope of the invention. Thus, it is intended that the present invention cover the modifications and variations of this invention provided they come within the scope of the appended claims and their equivalents.

What is claimed is:

1. An inverse telecine converting device for converting quasi-television motion picture information back to original cinema motion picture information, the quasi-television motion picture information having been obtained by quasi-converting the original cinema motion picture information, the inverse telecine converting device comprising:

means for inputting the quasi-television motion picture information including field picture information pieces time-sequentially arranged at a rate of N frames per second (with N being a natural number), each frame of the quasi-television motion picture information including top and bottom field picture information pieces such that one of every P field picture information pieces (with P being a natural number) of the quasi-television motion picture information is a repetitive field picture information piece;

means for producing judgment frames on the basis of timely-adjacent field picture information pieces of the quasi television motion picture;

means for determining the structure of each judgment frame as being one of a frame structure and a field structure;

means for identifying the repetitive field picture information pieces on the basis of the determined structures corresponding to timely-adjacent ones of the judgment frames; and means for outputting the original cinema motion picture information arranged at a rate of M frames per second (with M being a natural number), wherein the structure determining means subjects each judgment frame to orthogonal transformation and determines whether each judgment frame has the frame structure or the field structure on the basis of a high-order coefficient in the vertical direction of coefficients of a frequency area obtained through the orthogonal transformation.

2. The inverse telecine converting device according to claim 1, wherein the means for identifying identifies the repetitive field picture information pieces on the basis of timely-adjacent ones of the judgment frames both having the frame structure.

3. The inverse telecine converting device according to claim 1, the structure determining means determines that a specific judgment frame has the field structure if the absolute value of the high-order coefficient in the vertical direction is equal to or greater than a threshold value.

4. The inverse telecine converting device according to claim 1, wherein the structure determining means determines that a specific judgment frame has the field structure if the absolute value of the high-order coefficient in the vertical direction is greater than the corresponding absolute value of a timely adjacent judgment frame.

5. The inverse telecine converting device according to claim 1, wherein the means for identifying identifies the repetitive field picture information pieces on the basis of timely-adjacent ones of the judgment frame picture information pieces both having the frame structure.

6. The inverse telecine converting device according to claim 1, wherein P=N/(N−M).

7. An inverse telecine converting method for converting quasi-television motion picture information back to original cinema motion picture information, the quasi-television motion picture information having been obtain by quasi-converting the original cinema motion picture information, the inverse telecine converting method comprising:

inputting the quasi-television motion picture information including field picture information pieces time-sequentially arranged at a rate of N frames per second (with N being a natural number), each frame of the quasi-television motion picture information including top and bottom field picture information pieces such that one of every P field picture information pieces (with P being a natural number) of the quasi-television motion picture information is a repetitive field picture information piece;

producing judgment frames on the basis of timely-adjacent field picture information pieces of the quasi television motion picture;

determining the structure of each judgment frame as being one of a frame structure and a field structure;

identifying the repetitive field picture information pieces on the basis of the determined structures corresponding to timely-adjacent judgment frames; and outputting the original cinema motion picture information arranged at a rate of M frames per second (with M being a natural number), wherein the determining step includes the step of subjecting each judgment frame to orthogonal transformation and determining whether each judgment frame has the frame structure or the field structure on the basis of a high-order coefficient in the vertical direction of coefficients of a frequency area obtained through the orthogonal transformation.

8. The inverse telecine converting method according to claim 7, wherein the identifying step includes the step of identifying the repetitive field picture information pieces on the basis of timely-adjacent ones of the judgment frames both having the frame structure.

9. The inverse telecine converting method according to claim 7, wherein the determining step includes the step of determining that a specific judgment frame has a field structure if the absolute value of the high-order coefficient in the vertical direction is equal to or greater than a predetermined threshold value.

10. The inverse telecine converting method according to claim 7, wherein the determining step includes the step of determining that a specific judgment frame has the field structure if the absolute value of the high-order coefficient in the vertical direction is greater than the corresponding absolute value of a timely-adjacent judgment frame.

11. The inverse telecine converting method according to claim 7, wherein the identifying step includes the step of identifying the repetitive field picture information pieces on the basis of timely-adjacent ones of the judgment frame picture information pieces both having the frame structure.

12. The inverse telecine converting device according to claim 7, wherein P=N/(N−M).

13. An inverse telecine converting device for converting quasi-television motion picture information back to original cinema motion picture information, the quasi-television motion picture information having been obtained by quasi-converting the original cinema motion picture information, the inverse telecine converting device comprising:

first, second, and third field delays to receive a series of field picture information pieces from an input;

first, second, and third block generators to combine timely-adjacent field picture information pieces received from the input and the first, second and third field delays to produce a series of judgment frame picture information pieces, each judgment frame picture information pieces including two timely-adjacent information pieces;

a plurality of orthogonal transformers to subject each judgment frame to orthogonal transformation and to obtain a high-order coefficient of a frequency area on the basis of pixel values in the vertical direction for each judgment frame; and a comparator to compare each high-order coefficient and to determine whether each respective judgment frame picture information piece has a frame structure or a field structure.

14. The inverse telecine converting device according to claim 13, wherein a specific judgment frame is determined to have the field structure if the absolute value of the high-order coefficient in the vertical direction is equal to or greater than more than a threshold value.

15. The inverse telecine converting device according to claim 13, wherein a specific judgment frame is determined to have the field structure if the absolute value of the high-order coefficient in the vertical direction is greater than a corresponding absolute value of a timely-adjacent judgment frame.

16. The inverse telecine converting device according to claim 13, wherein the series of field information pieces includes first, second, third, and fourth field information pieces and the series of judgment frames includes first, second and third judgment frames such that the first block generator receives the third and fourth field information pieces to produce the third judgment frame picture information piece, the second block generator receives the second and third field information pieces to produce the second judgment frame picture information piece, and the third block generator receives the first and second field information pieces to produce the first judgment frame picture information piece.

* * * * *